United States Patent [19]
Toby

[11] 3,848,725
[45] Nov. 19, 1974

[54] DRIVEN-ARTICLE DROPPING MACHINE AND METHOD

[75] Inventor: Max E. Toby, San Francisco, Calif.

[73] Assignee: Toby Enterprises, San Francisco, Calif.

[22] Filed: Feb. 14, 1973

[21] Appl. No.: 332,249

[52] U.S. Cl.................................. 198/35, 198/127
[51] Int. Cl............................................ B65g 57/00
[58] Field of Search............ 198/35, 127 R, 192, 91; 193/35 G, 35 SS, 35 R

[56] References Cited
UNITED STATES PATENTS

| | | | |
|---|---|---|---|
| 443,089 | 12/1890 | Good | 198/91 |
| 1,795,137 | 3/1931 | Nye | 198/127 R |
| 1,812,976 | 7/1931 | Nistle | 198/127 R |
| 2,472,225 | 6/1949 | Muddiman | 198/127 R |
| 2,628,697 | 2/1953 | Prentice | 193/35 R |

Primary Examiner—Evon C. Blunk
Assistant Examiner—Douglas D. Watts
Attorney, Agent, or Firm—Harris Zimmerman

[57] ABSTRACT

A machine and method for handling articles. The system of this invention includes the receiving of a predetermined number of articles, such as slices of meat or other product, on a conveying device composed of two banks of opposed drive rollers assembled parallel to one another and in the same horizontal plane. Each roller is supported and driven from one end and each bank of rollers has a common support which houses the mechanism to drive the rollers. The roller supports are pivoted at one end so that both banks of rollers can be swung downwardly simultaneously. As they are opposed to one another and as one bank rotates clockwise and the other counter clockwise, the slices accumulated on the rollers will drop when the rollers are pivoted downward. The dropped slices may be deposited on a weighing device, conveyor, packager or any other unit positioned beneath the roller banks.

11 Claims, 5 Drawing Figures

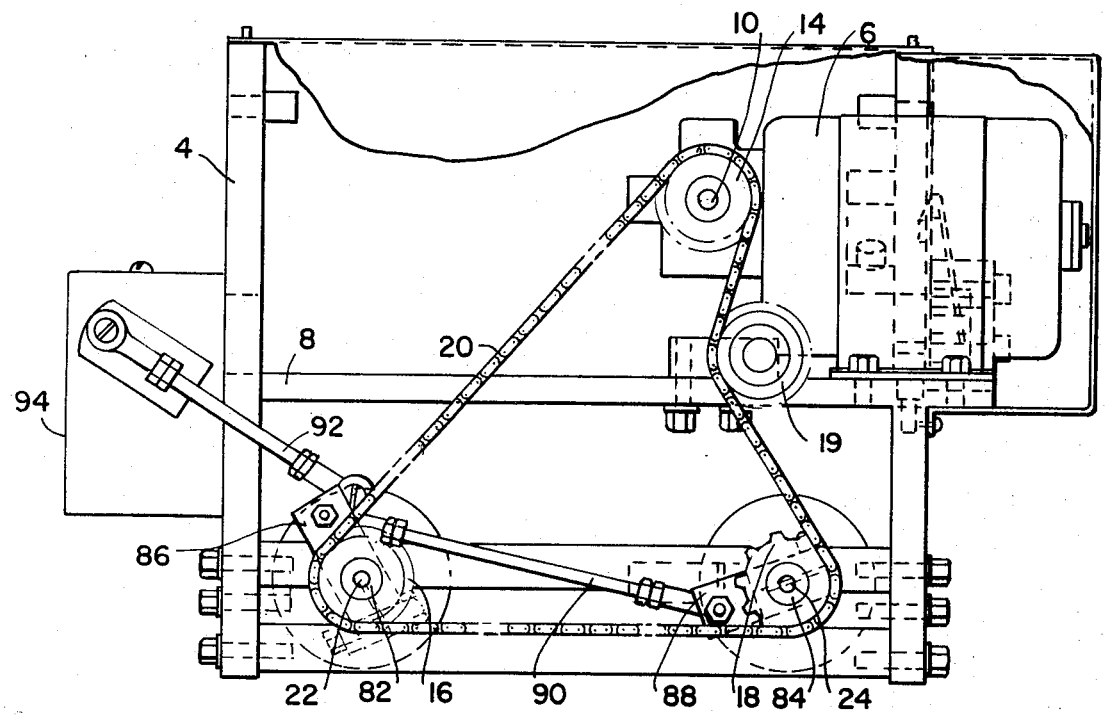
FIG_1
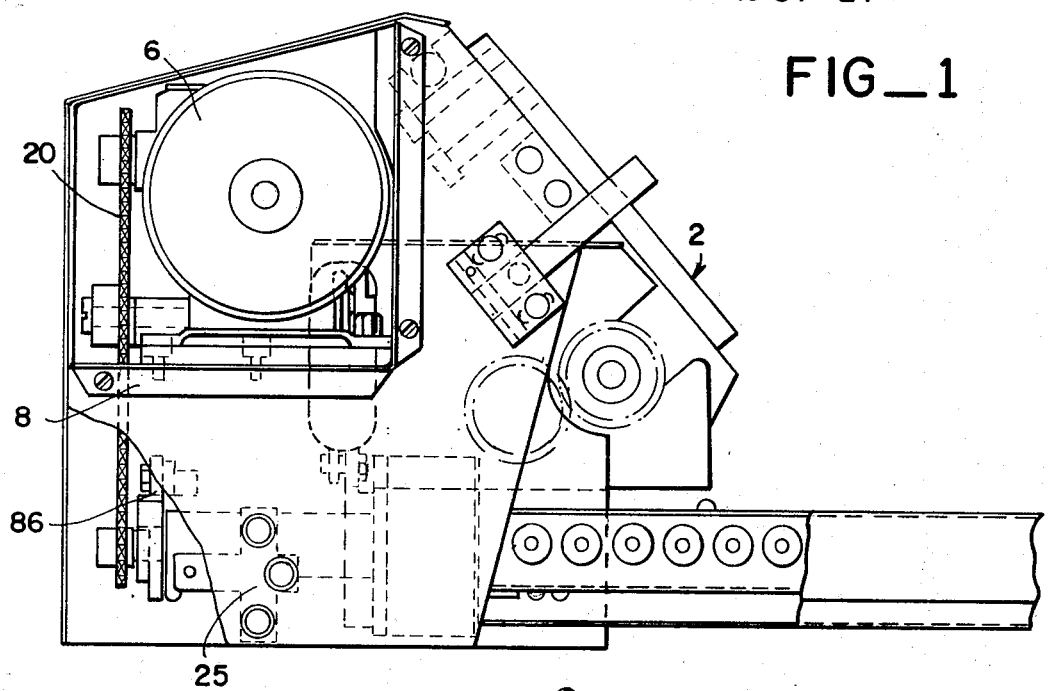
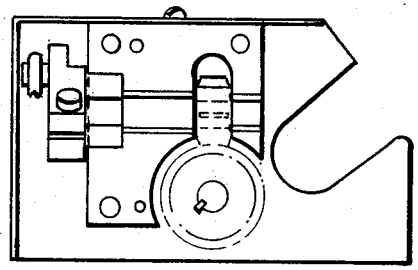
FIG_2

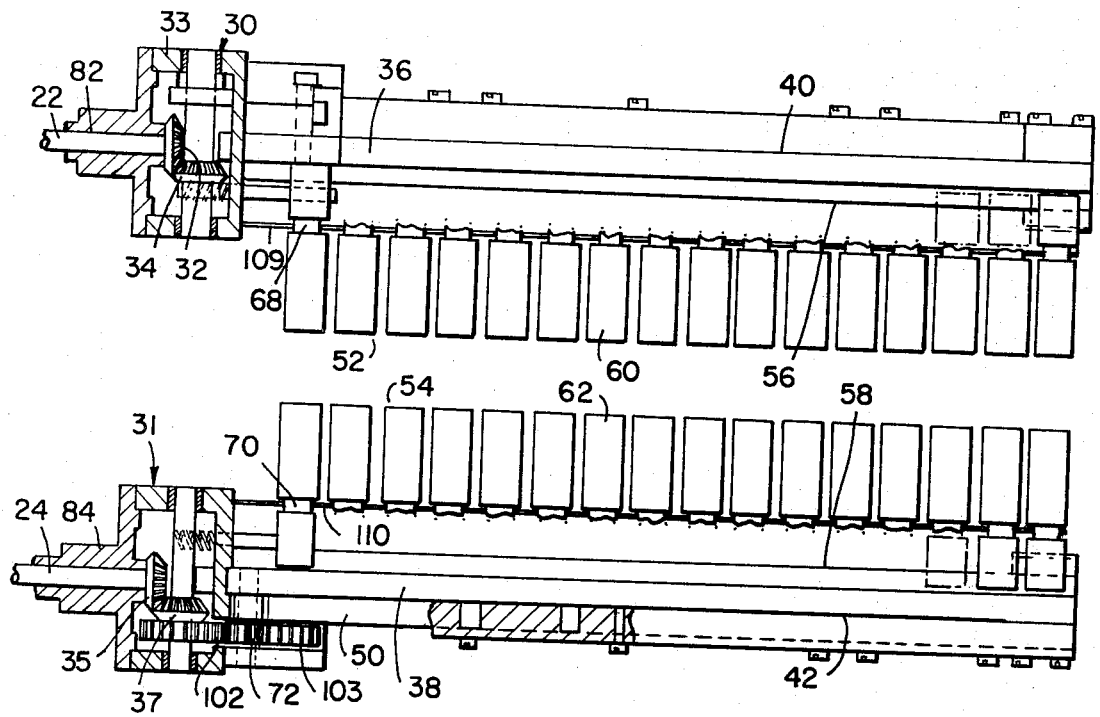
FIG_3
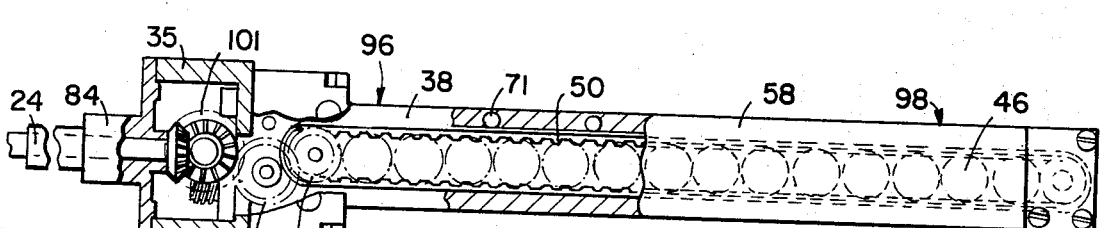
FIG_4
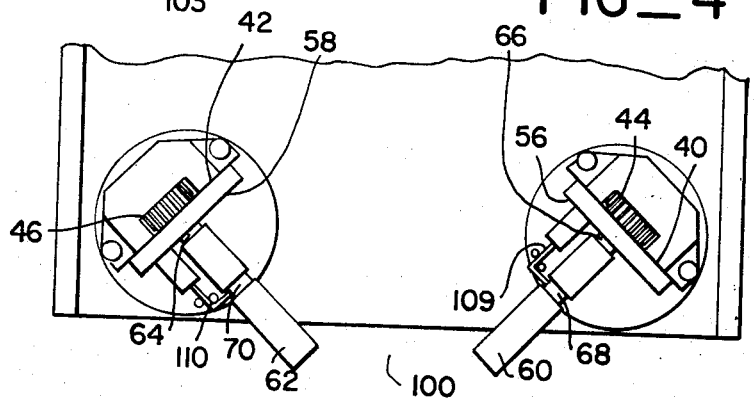
FIG_5

DRIVEN-ARTICLE DROPPING MACHINE AND METHOD

BACKGROUND OF THE INVENTION

The article handling system herein described will be discussed as applicable to the handling of sliced food product, namely meat slices; but, it will be understood that such specific reference is not intended to similarly limit the scope of protection claimed.

In conventional meat-slicing machines, the meat product to be sliced is held in a meat-gripping and feeding mechanism which advances the meat in such fashion as to move the product into and across a slicer-blade surface, thereby cutting individual slices of desired thickness from the parent slab of product. Usually, it is desirable to arrange such cut slices in one of two ways, i.e., either vertically stacked or shingle stacked. In the former, each slice is placed upon another in a vertical, contiguous relationship along a common axis; in the latter, each subjacent slice is partially covered by each higher slice in such fashion that only the total top surface of the top slice and the partial top surfaces of the subjacent slices appear in view, an arrangement which is often used in packaging sliced luncheon meat in see-through packages.

Such stacking of individual slices into either vertical or shingled stacks of a desired number of slices was originally done by hand, and later by a variety of complex mechanisms employing intercept conveyors, limit switches, weight controls, gravity-actuated devices and the like. While these mechanisms perform satisfactorily in the main for vertical stacking, they are subject to one primary undesirable limitation for shingles tacking; that is, they generally necessitate undesirable human intervention into the machine cycles to break a continuously shingled aggregate of slices into units of appropriate number of slices for packaging, or an undesirable deliberate stopping of the usually relatively high speed slicing operation to permit a spacing between adjacent shingled units of aggregate slices.

It is accordingly an object of the present invention to provide a method and an apparatus, as generally defined above, in which a predetermined number of slices of meat or other articles may be received at a receiving station, moved to a longitudinally-spaced discharge station, and discharged thereat to a subjacent scale or the like without human intervention.

It is a further object of the present invention to provide a method and apparatus, as generally defined above, in which said individual slices of meat or other articles, after their individual deposit at said receiving station, are incrementally and positively moved longitudinally along a generally horizontal path such that a shingled stacking of said slices is achieved; and in which said shingle-stacked slices are then deposited or discharged in an aggregate body of a predetermined number of slices to a subjacent scale, conveyor or other mechanism.

THE DRAWINGS

FIG. 1 is a rear elevational view, partly broken away, of the rear motor frame and contained components of the meat-dropping machine of the present invention;

FIG. 2 is a side elevational view, partly broken away, of the motor frame and contained components illustrated in FIG. 1;

FIG. 3 is a top plan view of the roller-banks assembly and associated roller drive means;

FIG. 4 is a side elevational view of the roller-banks assembly illustrated in FIG. 3; and FIG. 5 is a front elevational view of the roller-banks assembly illustrated in FIG. 3, showing the roller-banks in pivoted, partially open position, and a subjacent external take-away conveyor.

DESCRIPTION OF AN ILLUSTRATIVE EMBODIMENT

In accomplishing the foregoing and related objects, a preferred embodiment of the instant invention is as follows.

The slice dropping apparatus of this invention is designed for attachment to and operation with a conventional meat-slicing machine, generally designated at 2, which may be of the types shown in U.S. Pat. Nos. 2,752,968 and 3,587,688. The present apparatus broadly consists of two major interconnecting assemblies, namely, a motor-housing assembly, generally illustrated in FIGS. 1 and 2, and a roller-banks assembly, best illustrated in FIGS. 3, 4 and 5. The apparatus, as best shown in FIG. 2, may be releasably attached to or otherwise positioned adjacent the slicer 2 so that the sliced product from the latter will be deposited on the roller banks as will be hereinafter described.

Referring first to the motor housing assembly, the same includes a motor frame 4 which is bolted or otherwise secured to the slicer 2. Bolted to a shelf 8 of the motor frame 4 is an AC synchronous motor 6 with a rotatable power take-off shaft 10. Attached to the shaft 10 is a drive sprocket 14. Also attached to the frame 4 are rotatable driven sprockets 16 and 18, and an idler sprocket 19, all of whose respective axes of rotation are in fixed spatial and parallel relationship with the axis of rotation of sprocket 14. Entrained about the periphery, and enmeshed with the teeth of sprockets 14, 16, 18 and 19, is an endless link-chain 20 which serves to impart rotary power from drive sprocket 14 to driven sprockets 16 and 18. Attached respectively to driven sprockets 16 and 18 are pinion shafts 22 and 24 which extend longitudinally along the axes of rotation of sprockets 16 and 18. Said shafts 22 and 24 extend longitudinally through a support member 25 of frame 4 through appropriate openings and are rotationally supported in same by appropriate bearing surfaces. As illustrated in FIGS. 3 and 4, shafts 22 and 24 at their distal ends are respectively input to V-drive boxes 30 and 31 which, through the respective cooperation of internal 90° "walking" bevel gear sets comprised of gears 32 and 34, and 35 and 37, respectively, convert the motive rotary power in shafts 22 and 24 to axes generally normal thereto.

Referring now to the roller-banks assembly, there is disclosed right and left-hand side rail frames 36 and 38 which are separated and opposed, extending along parallel longitudinal axes and remaining at all times parallel to each other and normal to the plane of sprockets 14, 16, 18 and 19. Further included are dual roller banks 52 and 54, each having a plurality of driven cylindrical rollers 60 and 62 which are individually axially rotatably mounted on axially parallel, uniformly-spaced center bearing shafts 64 and 66, said latter shafts are individually perpendicularly rotatably mounted to and through each of said two rail frames 36 and 38, and are fixedly connected at one distal end portion to the individual rollers 60 and 62, and fixedly connected at their other end portion to roller-driving pinion sprockets 44 and 46. The plane which includes said rollers of each bank is initially set parallel with the horizontal and, in this illustrative embodiment, longitudinally extending angle bars 109 and 110, affixed to the said rail frames 36 and 38, extend into circumferential grooves 68 and 70 in rollers 60 and 62 to hold said rollers in position and allow for easy removal during clean-up procedure.

Each of said rollers in each bank is rotatably mounted, via its shaft, on and normal to its bank's respective rail-frame opposed inner surface, 56 and 58, and each roller is keyed or otherwise fixed to its respective shaft such that said roller will turn with and will be driven by said shaft when motive rotary power is imparted to said shaft. Rotatably and normally secured to the outer faces 40 and 42 of rails 36 and 38 are a series of longitudinally-spaced roller-drive pinion-gear sprockets 44 and 46, supported by and fixed to said shafts 64 and 66 which traverse the cross-section of said respective rails through appropriately-sized cylindrical openings (not shown). In effect, therefore, the individual rollers on the inner face of each rail frame are fixed to and positively rotate with their individual respective sprockets on the outer face of said frame rail.

Each of said sprockets 44 and 46 is rotatably linked to each similar sprocket located on its respective rail frame by the entrainment of endless toothed belts 50 about the toothed peripheries of all said sprockets on each rail frame in such fashion that teeth of said belts enmesh with the teeth of said pinion sprockets. Each such belt or chain receives rotary power from the aforementioned motor 6 via its chain 20, motor-housing sprockets 16 and 18, pinion shafts 22 and 24, intermediate bevel-gear sets 32–34, and 35–37, all discussed above, through the cooperation of spur gears 101, idler gears 72 and master pinion gears 103, which latter gears serve to drive the first sprockets on the rails 36 and 38. Idler rollers 71 are used to maintain the belt teeth in engagement with the pinion sprockets.

Also included in the roller-banks assembly are two parallel pivot shafts 82 and 84 whose distal ends are secured to the V-drive box housings 30 and 31. The housings are, in turn, fixed to the side rail frames 36 and 38 such that when shafts 82 and 84 are rotated about their longitudinal axes, as discussed below and as illustrated in FIG. 5, said rail frames 36 and 38, together with their associated roller banks, sprockets, shafts and chains are also pivoted through equal angular arcs. The opposite end of said pivot shafts 82 and 84 are disposed within the motor-housing assembly. Attached to the periphery of said shafts at a position intermediate the V-drive housing boxes 30 and 31 and the plane of sprockets 14, 16, 18 and 19, are levers 86 and 88 fixed in suitable angular relationship with each other so as to cooperate with a connecting tie-rod link 90 to function as an articulated kinematic linkage for angularly rotating said shafts 82 and 84 and, thereby, for angularly rotating in turn said V-drive housings 30 and 31, rail frames 36 and 38 and their attached components, including roller banks 52 and 54, arcuately downwardly and away from the frame and rollers of the opposed banks, as can best be seen in FIG. 5, so as to create a discharge opening 100 between the pivoted roller banks and above a conveniently placed subjacent exit conveyor 112, scale or other mechanism. In practice, the shafts 82 and 84 rotate through about 90°, and the angular position shown in FIG. 5 is an intermediate position. The actuating mechanism for so motivating said linkage includes a plunger 92 which may be driven by a solenoid or other conventional electromechanical device (whose details are omitted for the purpose of this illustrative embodiment, and which is merely illustrated as contained in an actuator housing 94) upon appropriate signal from an electronic magnet-impulse counter (not shown) attached to slicer 2, the function of said counter being to count the cumulative number of slices of meat product sliced by said slicer during each dropping-machine cycle.

OPERATION OF THE ILLUSTRATIVE EMBODIMENT

The operation of the illustrative embodiment of the instant invention is as follows:

The rollers 60 and 62, continuously rotatably driven by the synchronous motor 6 via the power train described above, receive at a receiving station 96 meat product slices falling directly from the aforementioned slicing machine 2 and horizontally translate same longitudinally across the initially normally horizontally disposed and coplanar roller banks 52 and 54. After a predetermined number of slices have been sliced and received by the rollers, as determined by the electronic counting device (not shown), the plunger 92 is motivated by its actuating mechanism contained in actuator housing 94, thereby articulating the kinematic linkage, consisting of flanges 86 and 88 and tie-rod 90, so as to pivot the rail frames 36 and 38 and their respective roller banks 52 and 54 and attached components through downward equal arcs, thereby creating the opening 100, sufficient in size to permit the aggregate of sliced-product slices positioned along the roller banks 52 and 54 to drop downwardly from said roller banks between said rollers 60 and 62 and onto the subjacent conveyor 112 for removal to later stations for additional processing, such as weighing and packaging.

To obtain non-shingled vertical stacking, the driven rollers 60 and 62 may be stopped by a controlled motor-intercept device operating on the motor 6, not the slicer motor, until the desired number of individual slices have been cut, received and vertically stacked at the receiving station 96. The rollers 60 and 62 are caused to rotate so as to move the thus formed stack longitudinally across the roller banks. Then, the rail frames 36 and 38 and roller banks 52 and 54 pivot arcuately downwardly to permit the stacked aggregate slices to drop downwardly en masse onto the subjacent conveyor 11, scale or other mechanisms, after which the roller banks are returned to their initial horizontal-plane "closed" orientation by mere reversal of the above described actuation of plunger 92. Note that with proper timing setup, at no time need the high speed slicing operation be interrupted to accomplish this function, and at no time is human intervention into the machine cycle required.

To obtain shingled stacking, the driven rollers 60 and 62 are driven at a constant rotational velocity without interruption and, as each slice is received at the intercept station 96 from the slicer 2, it and all prior-received slices are incrementally advanced longitudinally across the roller banks 52 and 54 before the next slice is received, thereby creating an over-lapping shingled-stacked effect. Of course, the relative rotational velocities of the motor 6 and the slicer 2 will have to be adjusted such that the aforementioned incremental advance between slices is less than one slice width, so as to insure true shingling. (It is noted that, were the increment to be greater than one slice width, this apparatus would neither shingle stack nor vertical stack, but rather would space the individual slices singly along the longitudinal length of the roller banks. Such utilization may be desired for certain applications, and is considered an additional embodiment of the instant invention.) After the predetermined number of slices have been sliced, received and shingled at the receiving station 96, the rail frames 36 and 38 and roller banks 52 and 54 pivot arcuately downwardly to permit the aggregate mass of shingled slices to drop downwardly en masse onto the subjacent conveyor 112, whereupon the roller banks are returned to their initial horizontal plane "closed" orientation by mere reversal of the above-described actuation of plunger 92. Note that with proper timing setup, at no time need the high speed slicing operation be interrupted to accomplish this function, and at no time is human intervention into the machine cycle required.

In both the aforementioned applications (i.e., to obtain non-shingled vertical stacking and shingled stacking) the instant invention may also be used in conjunction with an apparatus and method for placing paper sheets between the product slices, such as is shown in U.S. Pat. No. 2,813,798.

The instant invention can also be used in connection with a device known as a "demand slicer," such as is shown in U.S. Pat. No. 3,587,688, where it is desirable to shingle and drop meat slices on demand onto a bun for an attractive sandwich and the like. In this application, the slicer will pre-slice the desired number of slices and the driven-roller dropper of the instant invention will arrange the same in shingled fashion, as previously described, but will not drop same immediately, but rather will hold same at the station on the rollers by de-activating the driven rollers after the desired number of slices have been sliced, and holding said rollers, as well as the slicer, in a controlled idle phase until a demand is made, i.e., until a bun is inserted into a subjacent station to receive the slices, whereupon a signal will be given by a limit-switch or other appropriate device, activated by the insertion of the bun, to cause the rail frames 36 and 38 and roller banks 52 and 54 to arcuately pivot to permit the shingled stack of slices to drop onto the subjacent bun, whereupon the slicer will resume a slicing cycle to prepare for the next demand, and the roller banks will return to their normal "closed" position.

I claim:

1. A method of handling articles which consists of sequentially depositing articles onto a longitudinally extending driven conveyor means at a receiving station disposed along the length thereof, directly supportingly engaging said articles on said conveyor means for substantially the greater portion of their width, positively moving said conveyor means and the articles deposited thereon from said receiving station along a longitudinal path having a width equal to the width of the article being conveyed and longitudinally spaced from said receiving station, and then moving said conveyor means in a direction other than along the longitudinal length thereof to provide a discharge opening for said articles in the longitudinal path of said conveyor means to thereby cause said articles to gravitally drop from said conveyor means immediately below said longitudinal path.

2. The method as set forth in claim 1, in which after said deposit of each said article on said conveyor means at said receiving station, said article and all preceeding articles in a cycle are incrementally moved with the movement of said conveyor means until a predetermined number of articles in said cycle are supported by said conveyor means, thereby creating a shingled stacking of said articles one upon another in an agglomeration, and in which thereafter said agglomeration is caused to gravitally drop from said conveyor means.

3. A method as set forth in claim 1 in which said conveyor means includes a plurality of rollers each having an axis of rotation normal to the conveyor length and all normally lying in a common generally horizontal plane, said rollers all being incrementally positively rotated in the same direction, said conveyor movement in said other direction moving said rollers to a position wherein their rotational axes are generally vertically disposed.

4. A method as set forth in claim 1 in which said articles are deposited on a pair of said conveyor means disposed in coplanar relation in a generally horizontal plane and spaced in a transverse direction to the length thereof and with each of said pair adapted to support transversely spaced portions of said articles, and said other movement being a downward rocking movement of each conveyor means about a longitudinal horizontal axis disposed at the outermost side portions of said conveyor means whereby said articles gravitally drop between said pair of conveyor means.

5. A method as set forth in claim 1 in which a means for driving said conveyor means continually moves same in said first-mentioned direction from said receiving station while and at the same time another conveyor-moving means both initially moves said conveyor means in said second-mentioned direction other than along its own longitudinal length, and then secondly returns same to its original position.

6. An apparatus for handling articles, including a generally horizontal conveyor means extending longitudinally from an article receiving station, means for positively driving said conveyor means in a direction along its longitudinal length, a member supporting said conveyor means for movement thereof in a direction other than along its own longitudinal length, means for moving said conveyor means in said other direction and then returning said conveyor means to its original position, said conveyor means including a pair of roller banks disposed in coplanar relation in a generally horizontal plane and spaced in a transverse direction to the longitudinal length thereof, each of said pairs comprising a plurality of rollers whose axes of rotation are all coplanar, with each roller axis being generally normal to the longitudinal length of said conveyor means and to the direction of longitudinal transfer of said articles and remaining generally normal thereto during said moving of said conveyor means in said other direction other than along the longitudinal length of said conveyor means, said means for positively driving said conveyor means rotating said rollers all incrementally positively in the same direction, and means for moving each of said roller banks to a generally vertical plane and then returning same to said initial generally horizontal plane by pivoting same in rocker-like fashion arcuately downward about parallel pivot axes and then pivoting same arcuately upward about said pivot axes.

7. An apparatus as set forth in claim 6 in which said member includes two axially parallel rail frames, generally horizontally coplanar and uniformly spaced in a transverse direction to the longitudinal length thereof, said frames each rotatably supporting the rollers of a corresponding bank.

8. An apparatus as set forth in claim 7 in which said means for moving and returning said roller banks includes an articulated linkage fixed to points on said frames for moving and returning both said frames and said roller banks.

9. An apparatus as set forth in claim 8 in which said rollers in each bank are fixed to corresponding individual sprockets each also rotatably fixed to said respective frames, and in which an endless chain is entrained about all sprockets on each frame, the plane of said sprockets and said chain being generally normally vertical and parallel to the longitudinal axes of said frames.

10. An apparatus as set forth in claim 9 in which said means for positively driving said conveyor means in said direction along its longitudinal length includes a walking bevel-gear set associated with each roller bank, one gear of each set operatively connected with its bank's corresponding sprockets and chain, and the other gear of said set operatively connected with said conveyor driving means.

11. An apparatus as set forth in claim 10 in which said means for moving said conveyor means in said other direction includes a rotatable housing associated with each frame, each said housing substantially enveloping a corresponding bevel-gear set and being at one distal end fixed to its corresponding frame, and at its other distal end fixed to a point on said articulated linkage.

* * * * *